(12) United States Patent
Kim et al.

(10) Patent No.: US 8,468,413 B2
(45) Date of Patent: Jun. 18, 2013

(54) APPARATUS AND METHOD FOR SETTING HYBRID AUTOMATIC REPEAT REQUEST AND AUTOMATIC REPEAT REQUEST PARAMETER IN MOBILE COMMUNICATION SYSTEM

(75) Inventors: Dong-Sook Kim, Suwon-si (KR); Byung-Suk Kim, Seoul (KR); Seong-Ryong Kang, Seongnam-si (KR); Chul-Ki Lee, Seoul (KR); Hong-Kyu Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 340 days.

(21) Appl. No.: 13/008,270

(22) Filed: Jan. 18, 2011

(65) Prior Publication Data
US 2011/0179329 A1    Jul. 21, 2011

(30) Foreign Application Priority Data

Jan. 18, 2010    (KR) ........................ 10-2010-0004341

(51) Int. Cl.
G08C 25/02    (2006.01)
H04L 1/18    (2006.01)

(52) U.S. Cl.
USPC ........................................................ 714/748

(58) Field of Classification Search
USPC ............. 714/18, 748; 370/252, 248; 709/230, 709/231
See application file for complete search history.

(56) References Cited

U.S. PATENT DOCUMENTS 8,121,048 B2 *   2/2012   Chen et al. .................... 370/252

OTHER PUBLICATIONS

Boujemaa et al., Evaluating the performance of ARQ and HARQ I over Nakagami fading channels., 2006, IEEE Info. & Comm. Tech. ICTTA $2^{nd}$ vol. 2, pp. 2669-2673.*

* cited by examiner

Primary Examiner — Shelly A Chase

(57) ABSTRACT

An apparatus is capable of setting HARQ and ARQ parameters in a mobile communication system. The apparatus sets HARQ and ARQ parameters in a mobile communication system. The apparatus sets a default HARQ parameter based on the determined default HARQ parameter setting condition determined by using a plurality of QCIs. The apparatus sets a default ARQ parameter based on the determined default ARQ parameter setting condition determined by using the plurality of QCIs, and updates the set default HARQ parameter and the set default ARQ parameter according to a channel status of a UE.

20 Claims, 8 Drawing Sheets

APPARATUS AND METHOD FOR SETTING HYBRID AUTOMATIC REPEAT REQUEST AND AUTOMATIC REPEAT REQUEST PARAMETER IN MOBILE COMMUNICATION SYSTEM

CROSS-REFERENCE TO RELATED APPLICATION(S) AND CLAIM OF PRIORITY

The present application is related to and claims priority to an application entitled "Apparatus and Method for Setting Hybrid Automatic Repeat Request and Automatic Repeat Request Parameter in Mobile Communication System" filed in the Korean Industrial Property Office on Jan. 18, 2010, and assigned Serial No. 10-2010-0004341, the contents of which are hereby incorporated by reference.

TECHNICAL FIELD OF THE INVENTION

The present invention relates to an apparatus and method for setting Hybrid Automatic Repeat reQuest (HARQ) and Automatic Repeat reQuest (ARQ) parameters in a mobile communication system.

BACKGROUND OF THE INVENTION

During a procedure (hereinafter, referred to as a "flow") for transmitting/receiving packets between an evolved Node B (eNB) and a User Equipment (UE) in a mobile communication system, each packet is retransmitted several times by a Hybrid Automatic Repeat reQuest (HARQ) process in order to reduce errors in a wireless section. When an eNB or UE transmits a packet in an Unacknowledged Mode (UM) of Radio Link Control (RLC), only HARQ retransmission is performed. In contrast, when the eNB or UE transmits a packet in an Acknowledged Mode (AM) of RLC, HARQ retransmission is performed, and ARQ retransmission is performed when the performed HARQ retransmission has failed.

An HARQ parameter, which is connected with the end-to-end performance of a flow in the eNB or UE, includes a maximum-number-of-retransmissions parameter max-HARQ-Tx, and an ARQ parameter includes a maximum-number-of-retransmissions parameter maxRetxThreshold and a plurality of timer parameters, that is, t_Reordering, t_StatusProhibit, and t_PollRetransmit. Here, the HARQ parameter and ARQ parameter are set to the same values in every flow by Radio Resource Control (RRC) of an eNB or UE.

When an eNB sets HARQ and ARQ parameters to the same values for all UEs without taking the channel status of each UE into consideration, as described above, it may exert a bad influence on the communication performance in a UM and/or AM according to the channel status of each UE. For example, when an eNB sets the HARQ and ARQ parameters based on an average channel status, an HARQ retransmission using the set HARQ parameter is performed even in the case where a channel is in a bad status, so that the probability of failure in the HARQ retransmission increases, and the communication performance in a UM is deteriorated. Also, in this case, since the number of ARQ retransmissions increases in an AM due to the failure of HARQ retransmission, delay time becomes longer, and the error rate also increases due to the set ARQ parameter, that is, due to the number of retransmissions.

Also, when an eNB independently sets the ARQ parameter without taking a preset HARQ parameter into consideration, it may exert a bad influence on the communication performance in an AM. For example, the eNB may perform an ARQ retransmission before an HARQ retransmission is terminated, or the t_StatusProhibit timer for an ARQ may not expire when the HARQ retransmission has been finished, thereby causing an unnecessary delay.

Accordingly, it is necessary to develop a method for setting HARQ and ARQ parameters optimized according to the channel status of each UE in a mobile communication system.

SUMMARY OF THE INVENTION

To address the above-discussed deficiencies of the prior art, it is a primary object to provide an apparatus and method for setting HARQ and ARQ parameters in a mobile communication system.

Also, the present invention provides an apparatus and method for setting HARQ and ARQ parameters optimized according to the channel status of each UE in a mobile communication system.

In addition, the present invention provides an apparatus and method for setting default HARQ and ARQ parameters and updating the set default HARQ and ARQ parameters according to the channel status of each UE in a mobile communication system.

In accordance with an aspect of the present invention, there is provided an apparatus for setting Hybrid Automatic Repeat reQuest (HARQ) and Automatic Repeat reQuest (ARQ) parameters in a mobile communication system, the apparatus including: an HARQ parameter setting unit that sets a default HARQ parameter based on a default HARQ parameter setting condition determined by using a plurality of Quality Collaboration Indexes (QCIs); an ARQ parameter setting unit that sets a default ARQ parameter based on a default ARQ parameter setting condition determined by using the plurality of QCIs; and a parameter updating unit that updates the set default HARQ parameter and the set default ARQ parameter according to a channel status of a User Equipment (UE).

In accordance with another aspect of the present invention, there is provided a method for setting Hybrid Automatic Repeat reQuest (HARQ) and Automatic Repeat reQuest (ARQ) parameters in a mobile communication system, the method includes: setting a default HARQ parameter based on a default HARQ parameter setting condition determined by using a plurality of Quality Collaboration Indexes (QCIs); setting a default ARQ parameter based on a default ARQ parameter setting condition determined by using the plurality of QCIs; and updating the set default HARQ parameter and the set default ARQ parameter according to a channel status of a User Equipment (UE).

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system. The following description will be given only about a part necessary to understand the operation of the present invention, and the other background technology will be omitted in order to prevent the subject matter of the present invention from being obscured.

The present invention proposes a technology for setting HARQ and ARQ parameters in common for every flow based on an average channel status set as default, periodically measuring the channel status of each User Equipment (UE), and updating the HARQ and ARQ parameters in order to set HARQ and ARQ parameters optimized according to the channel status of the UE in a mobile communication system.

Hereinafter, an apparatus and method for setting HARQ and ARQ parameters in a mobile communication system according to an exemplary embodiment of the present invention will be described.

Figure 1:
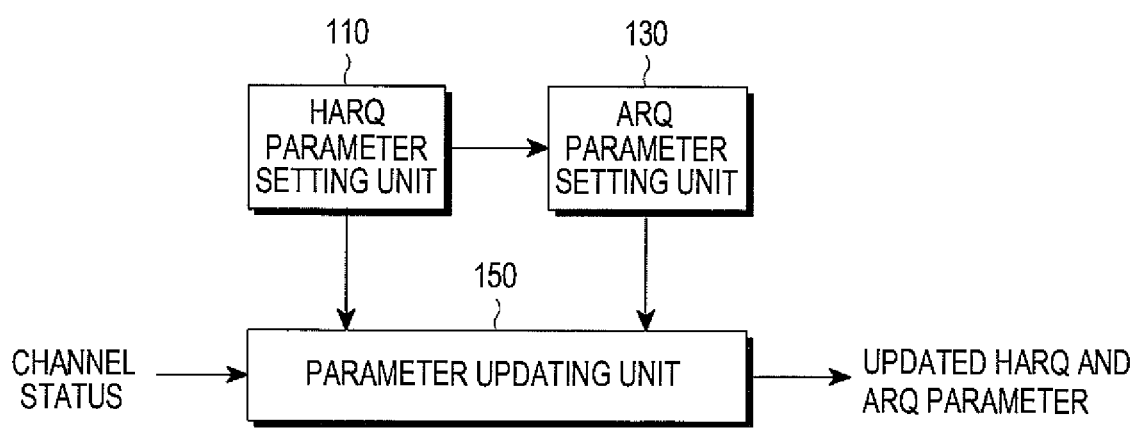
FIG. 1 is a block diagram illustrating the configuration of an HARQ and ARQ parameter setting apparatus according to an embodiment of the present invention.

FIG. 1 is a block diagram illustrating the configuration of an HARQ and ARQ parameter setting apparatus according to an exemplary embodiment of the present invention. The HARQ and ARQ parameter setting apparatus, illustrated in FIG. 1, may be included in an evolved Node B (eNB) or UE.

Referring to FIG. 1, the HARQ and ARQ parameter setting apparatus includes an HARQ parameter setting unit 110, an ARQ parameter setting unit 130, and a parameter updating unit 150.

First, the HARQ parameter setting unit 110 sets an average channel status, determines an HARQ parameter setting condition based on the set average channel status, and then sets a default HARQ parameter, that is, maxHARQ-Tx, which meets the determined HARQ parameter setting condition, in common in every flow.

Similarly to the HARQ parameter setting unit 110, the ARQ parameter setting unit 130 sets an average channel status and determines an ARQ parameter setting condition based on the set average channel status. Then, the ARQ parameter setting unit 130 sets default ARQ parameters, that is, maxRetxThreshold, t_Reordering, t_StatusProhibit, and t_PollRetransmit, which meet the determined ARQ parameter setting condition, in common in every flow.

Also, the parameter updating unit 150 periodically measures the channel status of each UE, updates the default HARQ and ARQ parameters, which have been set by the HARQ parameter setting unit 110 and ARQ parameter setting unit 130, according to the current channel status of the UE, and then outputs the updated HARQ and ARQ parameters.

Hereinafter, a method for setting the maxHARQ-Tx, which is an HARQ parameter, and the maxRetxThreshold, t_Reordering, t_StatusProhibit, and t_PollRetransmit, which are ARQ parameters, to default, and then updating the HARQ and ARQ parameters set to default in the HARQ and ARQ parameter setting apparatus will be described in detail with reference to FIG. 2.

Figure 2:
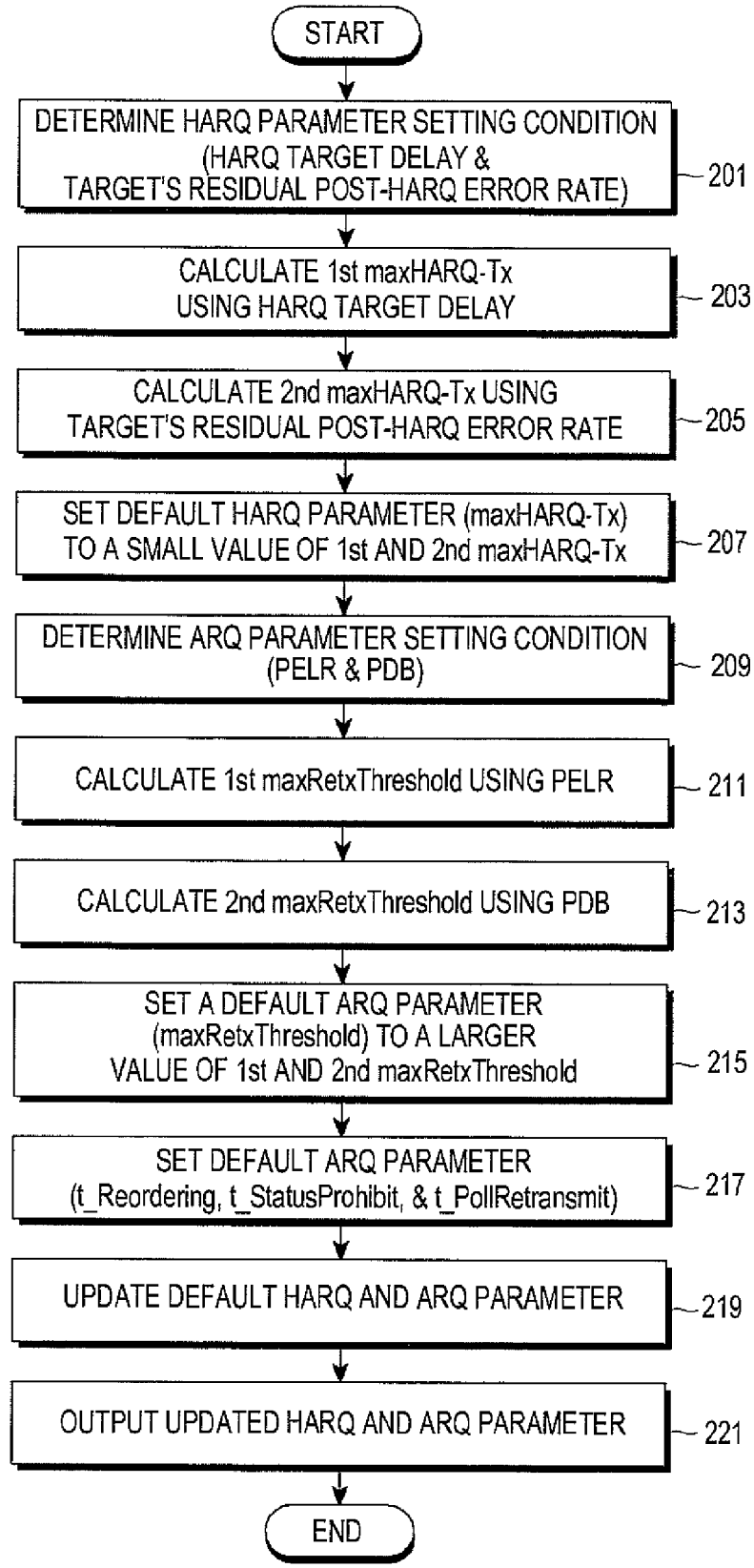
FIG. 2 is a flowchart illustrating a procedure of setting HARQ and ARQ parameters according to an embodiment of the present invention.

FIG. 2 is a flowchart illustrating a procedure of setting HARQ and ARQ parameters according to an exemplary embodiment of the present invention.

First, since only an HARQ is transmitted in a flow corresponding to a UM, and an HARQ and an ARQ are transmitted in a flow corresponding to an AM, the HARQ parameter setting unit 110 sets an HARQ parameter which meets a performance requirement condition in a flow corresponding to a UM, that is, an HARQ parameter setting condition, in blocks 201 to 207. Then, when the setting of the HARQ parameter has been completed, the ARQ parameter setting unit 130 sets an ARQ parameter which meets a performance requirement condition in a flow corresponding to an AM, that is, an ARQ parameter setting condition, in blocks 209 to 217. In this case, since a large number of ARQ retransmissions may be performed in the AM, the eNB or UE transmits packets corresponding to one or more Quality Collaboration Indexes (QCIs) having a Packet Error Loss Rate (PELR) equal to or higher than a threshold value in the AM, and transmits packets corresponding to the other QCIs among the overall QCIs in the UM. That is, the eNB or UE transmits packets corresponding to each QCI in the AM or UM by making reference to Table 1 below.

Table 1 below shows an available RLC mode mapping according to each QCI by making reference to standardized QCI characteristics which are specified in 3rd Generation Partnership Project (3GPP) Standard TS 23.203.

TABLE 1

| QCI | Resource Type | Packet Delay Budget | Packet Error Loss Rate | Example Services | Available RLC Mode Mapping |
|---|---|---|---|---|---|
| 1 | GBR | 100 ms | $10^{-2}$ | VoIP | UM |
| 2 |  | 150 ms | $10^{-3}$ | Live Streaming Video | UM |
| 3 |  | 50 ms | $10^{-3}$ | Real Time Gaming | UM |
| 4 |  | 300 ms | $10^{-6}$ | Buffered Streaming Video | AM |
| 5 | Non-GBR | 100 ms | $10^{-6}$ | IMS Signaling | AM |
| 6 |  | 300 ms | $10^{-6}$ | TCP-based, Buffered Streaming Video | AM |
| 7 |  | 100 ms | $10^{-3}$ | Voice, Live Streaming Video | UM |
| 8 |  | 300 ms | $10^{-6}$ | TCP-based, Buffered Streaming Video | AM |
| 9 |  | 300 ms | $10^{-6}$ | TCP-based, Buffered Streaming Video | AM |

As shown in Table 1, the eNB or UE transmits packets corresponding to QCI #4, #5, #6, #8, and #9, which have a PELR of $10^{-6}$, in the AM; and transmits packets corresponding to QCI #1, #2, #3, and #7, which are the other QCIs, in the UM.

By using such a scheme, in block 201, the HARQ parameter setting unit 110 determines an HARQ parameter setting condition for setting an HARQ parameter based on the mapping shown in Table 1. Here, the HARQ parameter setting condition determined based on an HARQ target delay and a target residual post-HARQ error rate.

In Table 1, a Packet Delay Budget (PDB) of the tightest boundary is 50 ms, wherein the PELR is $10^{-3}$. Here, a 50 ms PDB, which corresponds to QCI #3 and a real-time game service, satisfies a 30 ms delay, including a scheduling delay and an HARQ delay between an eNB and a UE, except for an average delay on a backhaul. To this end, a specific scheduling is required, so that the HARQ parameter setting unit 110 sets a specific HARQ parameter for QCI #3, separately from the other QCIs. With respect to QCIs except for QCI #3, the HARQ parameter setting unit 110 determines an HARQ target delay to be 40 ms by aiming at 100 ms, which is the PDB of normal Voice over Internet Protocol (VoIP) traffics, and by taking a 40 ms average scheduling delay and a 20 ms average delay on a backhaul into consideration. Also, the HARQ parameter setting unit 110 additionally gives a margin to $10^{-3}$, which is the tightest PELR among packets corresponding to QCIs transmitted in the UM, and determines a target residual post-HARQ error rate to be $10^{-4}$.

Next, the HARQ parameter setting unit 110 a default maxHARQ-Tx in blocks 203 to 207 based on the determined HARQ parameter setting condition, that is, the HARQ target delay and the target residual post-HARQ error rate. That is, the HARQ parameter setting unit 110 determines a first maxHARQ-Tx and a second maxHARQ-Tx by means of equations 1 and 2 below, and then sets a smaller value of the determined first and second maxHARQ-Txs as a default maxHARQ-Tx. Here, the first maxHARQ-Tx represents a maxHARQ-Tx determined based on the HARQ target delay, and the second maxHARQ-Tx represent a maxHARQ-Tx determined based on the target residual post-HARQ error rate.

The operation of the HARQ parameter setting unit 110 performed in blocks 203 to 207 will now be described in detail.

In block 203, the HARQ parameter setting unit 110 determines the first maxHARQ-Tx by means of equation 1 below based on the HARQ target delay, which has been determined in block 201. Equation 1 is an equation for determining the first maxHARQ-Tx to meet 40 ms, which is the determined HARQ target delay. In order to complete an HARQ procedure within 40 ms by taking an HARQ retransmission delay of 80 ms into consideration in the eNB or UE, the HARQ parameter setting unit 110 determines the first maxHARQ-Tx by means of Equation 1 below in block 203.

$$D = 4 \text{ ms} + 8 \text{ ms} * (\text{maxHARQ-Tx}) \leq 40 \text{ ms} \quad [\text{Eqn. 1}]$$

In equation 1, "D" represents an HARQ target delay, and "maxHARQ-Tx" represents the first maxHARQ-Tx. In Equation 1, since the "D" has a value of 40 ms or less, the first maxHARQ-Tx may be four.

Then, in block 205, the HARQ parameter setting unit 110 determines the second maxHARQ-Tx by means of Equation 2 below based on the target residual post-HARQ error rate, which has been determined in block 201. Equation 2 is an equation for determining the second maxHARQ-Tx to meet the determined target residual post-HARQ error rate.

$$P\_LE = 1 - \sum_{n=0}^{maxHARQ-Tx} (1 - P\_I)(P\_I)^n \leq 10^{-4} \quad [\text{Eqn. 2}]$$

In Equation 2, "P_LE" represents a target residual post-HARQ error rate, "P_I" represents a packet's initial transmission error rate measured by an operator, and "maxHARQ-Tx" represents the second maxHARQ-Tx.

With respect to the target residual post-HARQ error rate, the HARQ parameter setting unit 110 determines the second maxHARQ-Tx using Equation 2 when taking type-1 HARQ into consideration and ignoring a NACK error probability.

In a procedure of setting an average channel environment and determining a default HARQ parameter, that is, a default maxHARQ-Tx, the P_I is set as a target value used in determining an MCS level in a MAC layer. For reference, in a procedure of periodically measuring the channel status of a UE and updating an ARQ parameter, measured values are used.

In Equation 2, since the P_LE meets $10^{-4}$ when the target value of the P_I is 0.1, the HARQ parameter setting unit 110 determines the second maxHARQ-Tx with respect to the P_I's target value of 0.1 and the P_LE of $10^{-4}$ in block 205. Meanwhile, in the case of IR, a P_LE smaller than $10^{-4}$ may be used with respect to the same P_I's target value of 0.1.

Then, in block 207, the HARQ parameter setting unit 110 determines a smaller value of the determined first and second maxHARQ-Txs to be a default maxHARQ-Tx. Here, the reason why the HARQ parameter setting unit 110 determines a smaller value of the determined first and second max- HARQ-Txs to be a default maxHARQ-Tx is that it is effective to prevent waste of radio resources by reducing the number of retransmissions in a flow meeting a PELR requirement condition in the UM and to rapidly perform a retransmission by minimizing delay when a PELR of a flow is satisfied.

Thereafter, in block 209, the ARQ parameter setting unit 130 determines an ARQ parameter setting condition for setting an ARQ parameter. Here, the ARQ parameter setting condition determined based on the PELR requirement conditions and PDBs of QCIs corresponding to an RLC AM. That is, in block 209, the ARQ parameter setting unit 130 makes reference to the QCI characteristics standardized in Table 1, and determines a PELR of $10^{-6}$ corresponding to the AM and a PDB of 300 ms, which corresponds to the PDBs of the remaining QCIs, except for QCI #5, as the ARQ parameter setting condition. Here, since QCI #5 is a CI corresponding to a signaling service and has the highest priority, the PDB of QCI #5 is not considered.

Then, in blocks 211 to 215, in order to set a default maxRetxThreshold of an ARQ, the ARQ parameter setting unit 130 determines first and second maxRetxThresholds which meet the determined ARQ parameter setting condition by means of Equations 3 and 4 below, and then sets a larger value of the determined first and second maxRetxThresholds as the default maxRetxThreshold.

The ARQ parameter setting unit 130 retransmits a packet when an HARQ transmission has failed and a status Protocol Data Unit (status PDU) has been successfully received, and also retransmits a packet through polling even when a status PDU has an error. Therefore, the ARQ parameter setting unit 130 assumes that a retransmission is performed by the number of times of the first maxRetxThreshold at all times, and determines a first maxRetxThreshold, where the determined PELR is 10-6 or less, by means of equation 3 below.

$$1 - \sum_{n=0}^{maxRetxTreshold} (1 - P\_LE)(P\_LE)^n \leq 10^{-6} \quad [\text{Eqn. 3}]$$

In Equation 3, "maxRetxThreshold" represents the first maxRetxThreshold, and "P_LE" represents a target residual post-HARQ error rate. When the P_LE is $10^{-4}$, a first maxRetxThreshold of 1 or more meets a condition of $10^{-6}$ or less, which is the ARQ parameter setting condition. For example, when the first maxRetxThreshold has a value of 1, the target residual post-ARQ error rate becomes $10^{-8}$.

In block 213, the ARQ parameter setting unit 130 determines a second maxRetxThreshold, where the determined PDB is 300 ms or less, by means of equation 4 below.

$$D+2*D*(maxRetxTreshold) \leq 300 \text{ ms} \quad [\text{Eqn. 4}]$$

In Equation 4, "maxRetxThreshold" represents a second maxRetxThreshold, and "D" represents an HARQ target delay.

Then, the ARQ parameter setting unit 130 determines a maximum value of the determined first and second maxRetxThresholds as a default maxRetxThreshold.

Next, in block 217, the ARQ parameter setting unit 130 sets t_Reordering, t_StatusProhibit, and t_PollRetransmit, which are timer parameters of the ARQ parameter. In block 217, the ARQ parameter setting unit 130 sets the timer parameters to reduce unnecessary ARQ retransmissions.

Meanwhile, the default HARQ and ARQ parameter setting scheme, described with reference to blocks 201 to 217 in FIG. 2, is a scheme for setting the HARQ and ARQ parameters to equal values for all flows using an HARQ and ARQ parameter setting condition when there is no information on channels. Such a default HARQ and ARQ parameter setting scheme may be used when it is difficult to set separate HARQ and ARQ parameters according to each flow, or when it is difficult to change set parameters depending on time.

If an eNB or UE equally uses default HARQ and ARQ parameters in all flows, as described above, it is impossible to properly use the characteristics of flows having different QCI requirement conditions, and communication performance may be deteriorated because a channel status changed depending on the movement of the UE is not reflected. Also, if an eNB or UE equally uses default HARQ and ARQ parameters in all flows, it is difficult to reflect a scheduling delay depending on the amount of traffic, which makes it difficult to efficiently perform an HARQ retransmission.

Therefore, when default HARQ and ARQ parameters have been determined in blocks 201 to 217, the parameter updating unit 150 periodically measures the channel status of the UE and updates the default HARQ and ARQ parameters in block 219. Then, in block 221, the parameter updating unit 150 outputs the updated HARQ and ARQ parameters. Hereinafter, timer parameters included in the ARQ parameter will be described with reference to FIGS. 3 and 4.

Figure 3:
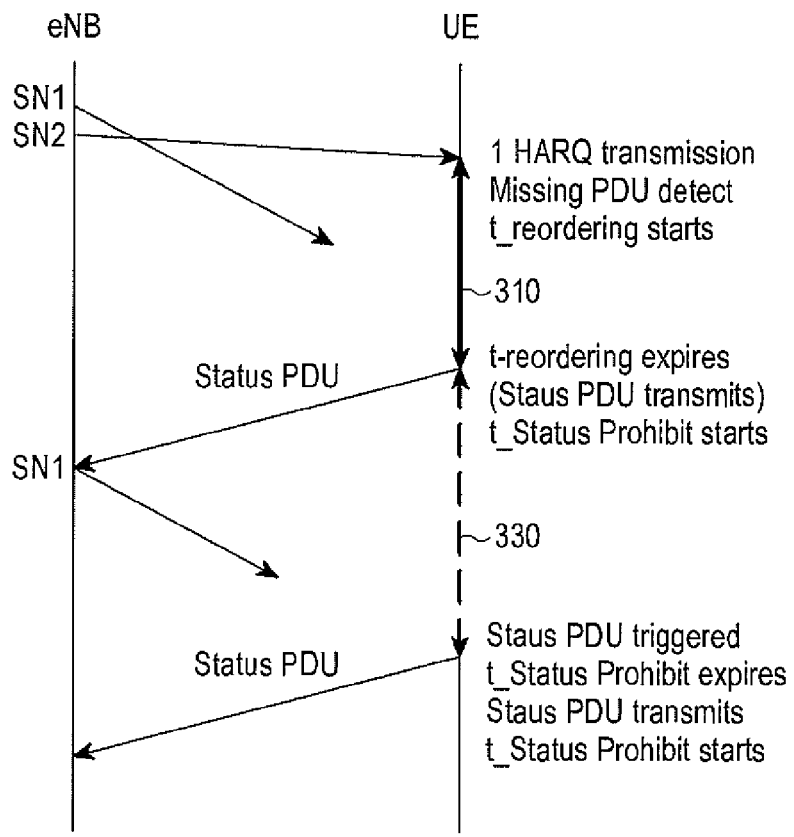
FIG. 3 is a signal flow diagram explaining t_Reordering and t_StatusProhibit which are used during a packet transmission/reception procedure between an eNB and a UE according to an embodiment of the present invention.

First, FIG. 3 is a signal flow diagram explaining t_Reordering and t_StatusProhibit which are used during a packet transmission/reception procedure between an eNB and a UE according to an embodiment of the present invention.

Referring to FIG. 3, when a UE detects no reception of a packet with Sequence Number (SN) 1, which has been transmitted from an eNB, the UE sets a t_Reordering 310 as a timer for setting a waiting time for the transmission of a status PDU. In FIG. 3, for example, when the eNB transmits packets in order from a packet with the lowest SN, and the UE receives a packet with SN 2 before receiving a packet with SN 1, which is a lower than SN 2, the UE detects that the packet with SN 1 has not been received.

The eNB retransmits the packet with SN 1 by the maxHARQ-Tx in maximum, thereby enabling the UE to successfully receive the packet with SN 1. Therefore, the t_Reordering 310 is set to a time period equal to or greater than a target HARQ delay "D."

Meanwhile, the t_StatusProhibit 330 is a timer which is used for the UE to again transmit a status PDU when the UE has transmitted the status PDU and then the eNB has failed in packet retransmission. Accordingly, the t_StatusProhibit 330 may be set to a time period corresponding to the sum of a status PDU transmission time period and a packet retransmission time period.

Figure 4:
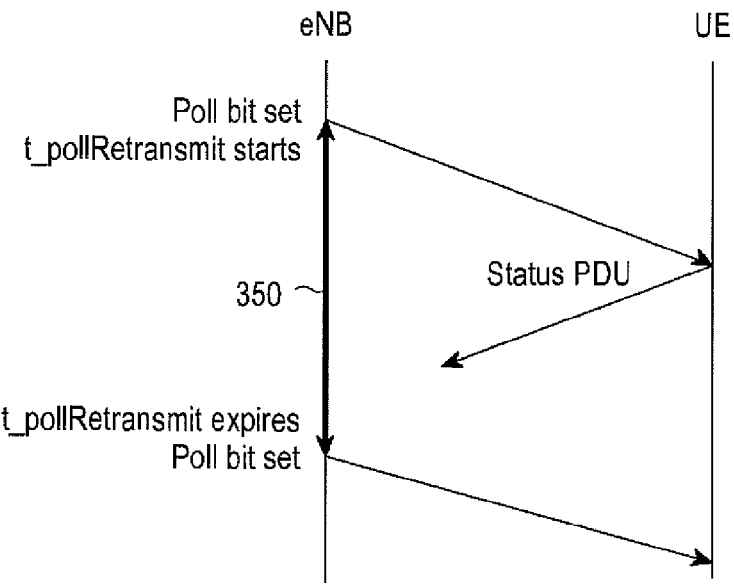
FIG. 4 is a signal flow diagram explaining t_PollRetransmit which is used during a packet transmission/reception procedure between an eNB and a UE according to an embodiment of the present invention.

FIG. 4 is a signal flow diagram explaining t_PollRetransmit which is used during a packet transmission/reception procedure between an eNB and a UE according to an embodiment of the present invention.

Referring to FIG. 4, in order to request the UE to transmit a status PDU, the eNB sets a poll bit in a data PDU and transmits the data PDU to the UE. Then, the eNB sets t_PollRetransmit 350 as a timer for establishing a waiting time for receiving the status PDU from the UE in response to the data PDU. Here, the t_PollRetransmit 350 is set by taking a time period during which the status PDU is transmitted from the UE into consideration.

Consequently, the t_StatusProhibit 330 and the t_PollRetransmit 350, described with reference to FIGS. 3 and 4, respectively, are set to a time period equal to or greater than "2*D."

Hereinafter, a procedure of updating default HARQ and ARQ parameters will be described in detail with reference to FIG. 5.

Figure 5:
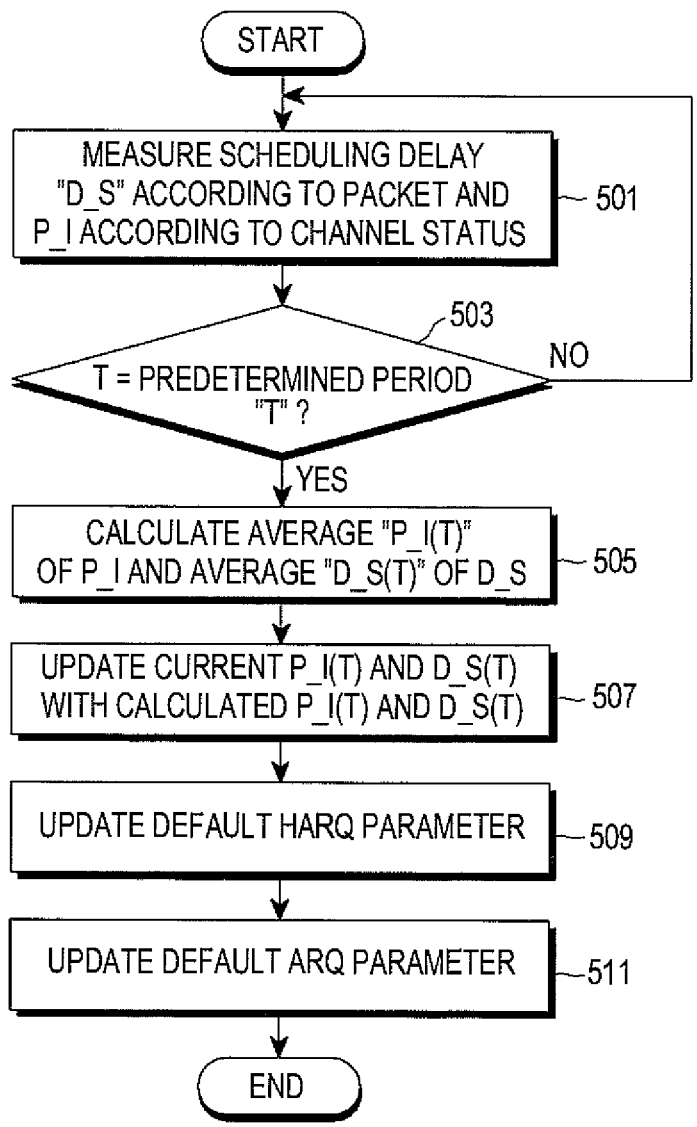
FIG. 5 is a flowchart illustrating a procedure of updating default HARQ and ARQ parameters in an HARQ and ARQ parameter setting apparatus according to an embodiment of the present invention.

FIG. 5 is a flowchart illustrating a procedure of updating default HARQ and ARQ parameters in an HARQ and ARQ parameter setting apparatus according to an embodiment of the present invention.

Referring to FIG. 5, blocks 501 to 507 are performed in a MAC layer, and blocks 509 and 511 are performed in an RRC layer.

In block 501, the parameter updating unit 150 in the HARQ and ARQ parameter setting apparatus measures a scheduling delay D_S of a packet and a P_I according to the current channel status. Then, in block 503, the parameter updating unit 150 determines if the current time "t" corresponds to a time according to a predetermined period "T," proceeds to block 505 when the current time "t" corresponds to a time according to a predetermined period "T," and returns to block 501 when the current time "t" does not correspond to a time according to a predetermined period "T." Here, the period "T" may be set to be longer than a preset period in an environment where a channel varies rapidly, and may be set to be shorter than the preset period in an environment where a channel varies slowly. Meanwhile, the matter of optimizing the period "T" is not included in the scope of the present invention.

Then, the parameter updating unit 150 calculates an average value P_I(t) of P_Is measured every period "T" and an average value D_S(t) of the measured D_Ss in block 505, and then updates the current P_I(t) and D_S(t) with the calculated P_I(t) and D_S(t) in block 507.

Next, in block 509, the parameter updating unit 150 updates a default maxHARQ-Tx using the updated P_I(t) and D_S(t) based on equations 5 and 6 below. That is, the parameter updating unit 150 determines upper bounds of D(t) and P_LE(t) according to the PDBs and PELRs of QCIs corresponding to an UM using the updated P_I(t) and D_S(t) based on equations 5 and 6 below.

$$D(t) = 4\ \text{ms} + 8\ \text{ms} * (\text{max}HARQ - Tx) <= PDB - 20\ \text{ms} - D\_S(t) \quad [\text{Eqn. 5}]$$

$$P\_LE(t) = 1 - \sum_{n=0}^{\text{max}HARQ-Tx} (1 - P\_I(t))(P\_I(t))n <= PLER * 0.1 \quad [\text{Eqn. 6}]$$

In Equation 5, D(t) is determined to be the same as "D" determined in Equation 1. That is, D(t) is "4 ms+8 ms* (maxHARQ-Tx)." Accordingly, the parameter updating unit 150 calculates a maxHARQ-Tx based on Equation 5, using the updated D_S(t) and PDBs according to Table 1.

Also, in Equation 6, P_LE(t) is determined to be the same as "P_LE" determined in equation 2. Accordingly, the parameter updating unit 150 calculates a maxHARQ-Tx based on Equation 6, using the updated P_I(t) and PELRs according to Table 1. Thereafter, the parameter updating unit 150 updates the default maxHARQ-Tx with a smaller value of the calculated maxHARQ-Txs.

Then, in block 511, the parameter updating unit 150 updates a default maxRetxThreshold using equations 3 and 4, and updates default t_Reordering, t_StatusProhibit, and t_PollRetransmit. That is, the parameter updating unit 150 updates a default maxRetxThreshold with a larger value of maxRetxThreshold(t)s, which meet conditions of $10^{-8}$ and 300 ms in Equations 3 and 4, respectively, based on P_LE(t) and D(t) of Equations 5 and 6. In addition, the parameter updating unit 150 updates t_Reordering to the D(t), and updates t_StatusProhibit and t_PollRetransmit to "2*D(t)."

Figure 6:
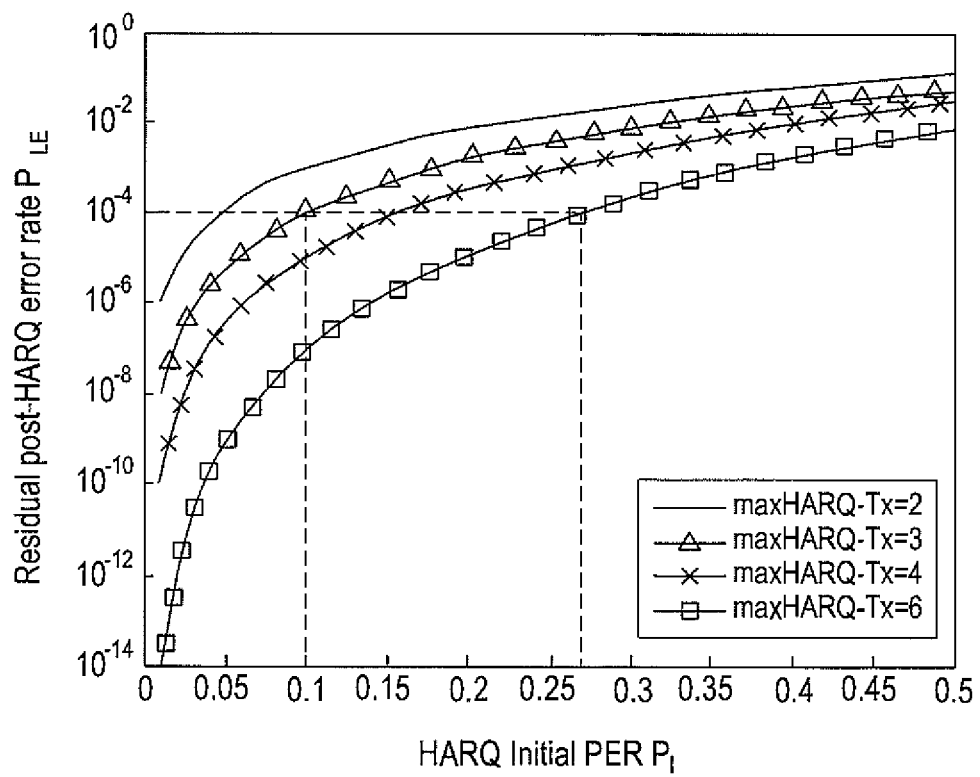
FIG. 6 is a graph illustrating P_LE according to P_I with respect to maxHARQ-Tx according to an embodiment of the present invention.

Therefore, according to an embodiment of the present invention, it is possible to update default HARQ and ARQ parameters and adaptively update HARQ and ARQ parameters according to channel statuses of a UE. As shown in FIG. 6, which shows P_LE according to P_I with respect to each maxHARQ-Tx, when the channel status of a specific UE becomes poor, and P_I changes from 0.1 to 0.27, an HARQ parameter "maxHARQ-Tx" required for meeting $10^{-4}$, which is an HARQ parameter setting condition, increases from 3 to 6. Accordingly, since the HARQ and ARQ parameter setting apparatus changes the HARQ parameter "maxHARQ-Tx" depending on channel statuses, it is possible to more efficiently perform an HARQ retransmission, and it is possible to enhance the efficiency of HARQ retransmissions in the UM.

Figure 7:
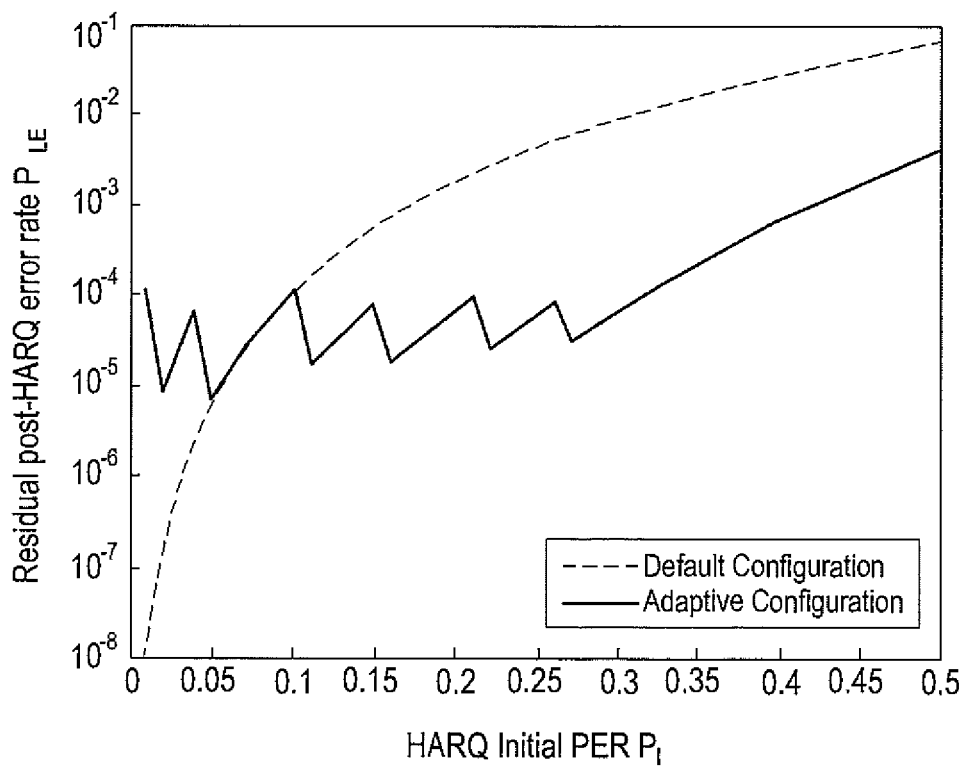
FIG. 7 is a view illustrating the target residual post-HARQ error rates of default HARQ and ARQ parameters and update HARQ and ARQ parameters according to an embodiment of the present invention.
Figure 8:
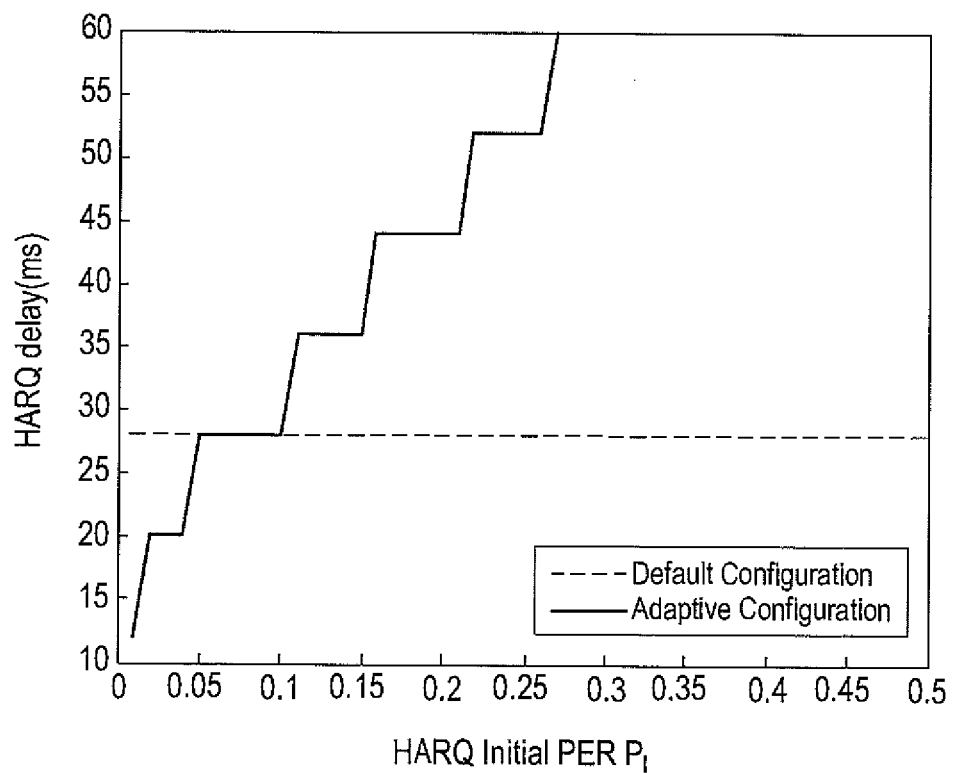
FIG. 8 is a view illustrating the HARQ target delay of default HARQ and ARQ parameters and update HARQ and ARQ parameters according to an embodiment of the present invention.
Figure 9:
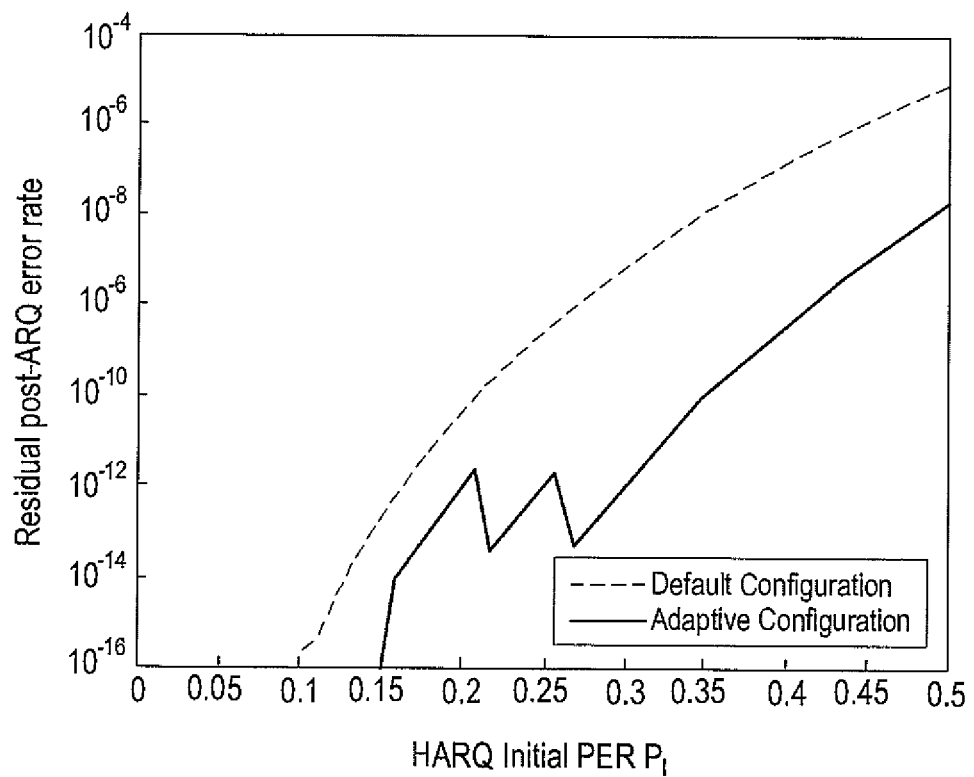
FIG. 9 is a view illustrating the target residual post-ARQ error rates of default HARQ and ARQ parameters and update HARQ and ARQ parameters according to an embodiment of the present invention.

FIGS. 7 to 9 show the target residual post-HARQ error rates, the HARQ target delay, and the target residual post-ARQ error rates of default (i.e. default-configuration) HARQ and ARQ parameters, and update (i.e. adaptive-configuration) HARQ and ARQ parameters according to an embodiment of the present invention.

Referring to FIGS. 7 to 9, when default-configuration HARQ and ARQ parameters are maxHARQ-Tx=3, and maxRetxThreshold=3, an HARQ delay is 28 ms. When P_I is less than 0.05, the target residual post-HARQ error rate of update (i.e. adaptive-configuration) HARQ and ARQ parameters is maintained at about 10-4, which is an HARQ parameter setting condition, thereby yielding a worse result than when the default HARQ and ARQ parameter update is not performed, but having an advantage in that an HARQ target delay is small. In the case of the UM, since flows have a characteristic that is more sensitive to a delay than to an error rate, it is more effective to reduce the delay. Also, when P_I is high, it seems that the HARQ delay of update HARQ and ARQ parameters increases. However, in this case, since the number of ARQ retransmissions is reduced, the overall delay is reduced, and a target residual post-ARQ delay probability decreases, so that a better result is obtained as compared with the case of using default HARQ and ARQ parameters.

According to an embodiment of the present invention, it is possible to update HARQ and ARQ parameters according to channel statuses of each UE. In addition, according to an embodiment of the present invention, since HARQ and ARQ parameters is set corresponding to channel statuses of each UE, it is possible to more effectively perform HARQ retransmissions, and it is possible to enhance the efficiency of HARQ retransmissions in the UM.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for setting Hybrid Automatic Repeat reQuest (HARQ) and Automatic Repeat reQuest (ARQ) parameters in a mobile communication system, the apparatus comprising:

an HARQ parameter setting unit configured to set a default HARQ parameter based on a default HARQ parameter setting condition determined by using a plurality of Quality Collaboration Indexes (QCIs);

an ARQ parameter setting unit configured to set a default ARQ parameter based on a default ARQ parameter setting condition determined by using the plurality of QCIs; and a parameter updating unit configured to update the set default HARQ parameter and the set default ARQ parameter according to a channel status of a User Equipment (UE).

2. The apparatus as claimed in claim 1, wherein the default HARQ parameter setting condition is determined based on an HARQ target delay and a target residual post-HARQ error rate of QCIs, except for QCIs having a highest Packet Error Loss Rate (PELR), among the plurality of QCIs.

3. The apparatus as claimed in claim 2, wherein the HARQ parameter setting unit is configured to calculate a first maximum number of HARQ retransmissions using the HARQ target delay, calculate a second maximum number of HARQ retransmissions using the target residual post-HARQ error rate, and set the default HARQ parameter to a smaller value of the calculated first maximum number of HARQ retransmissions and the calculated second maximum number of HARQ retransmissions.

4. The apparatus as claimed in claim 1, wherein the default ARQ parameter setting condition is determined based on a Packet Delay Budget (PDB) and a highest Packet Error Loss Rate (PELR) among PELRs of the plurality of QCIs.

5. The apparatus as claimed in claim 4, wherein the ARQ parameter setting unit is configured to calculate a first maximum number of ARQ retransmissions using the highest PELR, calculate a second maximum number of ARQ retransmissions using the PDB, set the default ARQ parameter to a larger value of the calculated first maximum number of ARQ retransmissions and the calculated second maximum number of ARQ retransmissions, and set the default ARQ parameter to a plurality of timers using a target HARQ delay time of QCIs, except for QCIs having a highest PELR, among the plurality of QCIs.

6. The apparatus as claimed in claim 1, wherein the parameter updating unit is configured to measure a scheduling delay and a transmission error rate of a packet according to the channel status, calculate a first average value of the measured scheduling delay and a second average value of the measured transmission error rate every predetermined period, update the set default HARQ parameter using the calculated first average value, and update the set default ARQ parameter using the calculated second average value.

7. A method for setting Hybrid Automatic Repeat reQuest (HARQ) and Automatic Repeat reQuest (ARQ) parameters in a mobile communication system, the method comprising:
    setting a default HARQ parameter based on a default HARQ parameter setting condition determined by using a plurality of Quality Collaboration Indexes (QCIs);
    setting a default ARQ parameter based on a default ARQ parameter setting condition determined by using the plurality of QCIs; and
    updating the set default HARQ parameter and the set default ARQ parameter according to a channel status of a User Equipment (UE).

8. The method as claimed in claim 7, wherein the default HARQ parameter setting condition is determined based on an HARQ target delay and a target residual post-HARQ error rate of QCIs, except for QCIs having a highest Packet Error Loss Rate (PELR), among the plurality of QCIs.

9. The method as claimed in claim 8, wherein setting the default HARQ parameter comprises:
    calculating a first maximum number of HARQ retransmissions using the HARQ target delay;
    calculating a second maximum number of HARQ retransmissions using the target residual post-HARQ error rate; and
    setting the default HARQ parameter to a smaller value of the calculated first maximum number of HARQ retransmissions and the calculated second maximum number of HARQ retransmissions.

10. The method as claimed in claim 7, wherein the default ARQ parameter setting condition is determined based on a Packet Delay Budget (PDB) and a highest Packet Error Loss Rate (PELR) among PELRs of the plurality of QCIs.

11. The method as claimed in claim 10, wherein setting the default ARQ parameter comprises:
    calculating a first maximum number of ARQ retransmissions using the highest PELR;
    calculating a second maximum number of ARQ retransmissions using the PDB;
    setting the default ARQ parameter to a larger value of the calculated first maximum number of ARQ retransmissions and the calculated second maximum number of ARQ retransmissions; and
    setting the default ARQ parameter to a plurality of timers using a target HARQ delay time of QCIs, except for QCIs having a highest PELR, among the plurality of QCIs.

12. The method as claimed in claim 7, wherein updating comprises:
    measuring a scheduling delay and a transmission error rate of a packet according to the channel status;
    calculating a first average value of the measured scheduling delay and a second average value of the measured transmission error rate every predetermined period;
    updating the set default HARQ parameter using the calculated first average value; and
    updating the set default ARQ parameter using the calculated second average value.

13. A base station capable of setting Hybrid Automatic Repeat reQuest (HARQ) and Automatic Repeat reQuest (ARQ) parameters in a mobile communication system, the base station comprising:
    an HARQ parameter setting unit configured to set a default HARQ parameter based on a default HARQ parameter setting condition determined by using a plurality of Quality Collaboration Indexes (QCIs) characteristic;
    an ARQ parameter setting unit configured to set a default ARQ parameter based on a default ARQ parameter setting condition determined by using the plurality of QCI characteristics; and
    a parameter updating unit configured to update the set default HARQ parameter and the set default ARQ parameter according to a channel status of a User Equipment (UE).

14. The base station as claimed in claim 13, wherein the default HARQ parameter setting condition is determined based on an HARQ target delay and a target residual post-HARQ error rate of QCIs, except for QCIs having a highest Packet Error Loss Rate (PELR), among the plurality of QCIs.

15. The base station as claimed in claim 14, wherein the HARQ parameter setting unit is configured to calculate a first maximum number of HARQ retransmissions using the HARQ target delay, calculate a second maximum number of HARQ retransmissions using the target residual post-HARQ error rate, and set the default HARQ parameter to a smaller value of the calculated first maximum number of HARQ retransmissions and the calculated second maximum number of HARQ retransmissions.

16. The base station as claimed in claim 13, wherein the default ARQ parameter setting condition is determined based on a Packet Delay Budget (PDB) and a highest Packet Error Loss Rate (PELR) among PELRs of the plurality of QCIs.

17. The base station as claimed in claim 16, wherein the ARQ parameter setting unit is configured to calculate a first maximum number of ARQ retransmissions using the highest PELR, calculate a second maximum number of ARQ retransmissions using the PDB, set the default ARQ parameter to a larger value of the calculated first maximum number of ARQ retransmissions and the calculated second maximum number of ARQ retransmissions, and set the default ARQ parameter to a plurality of timers using a target HARQ delay time of QCIs, except for QCIs having a highest PELR, among the plurality of QCIs.

18. The base station as claimed in claim 13, wherein the parameter updating unit is configured to measure a scheduling delay and a transmission error rate of a packet according to the channel status, calculate a first average value of the measured scheduling delay and a second average value of the measured transmission error rate every predetermined period.

19. The base station as claimed in claim 18, wherein the parameter updating unit is configured to update the set default HARQ parameter using the calculated first average value.

20. The base station as claimed in claim 18, wherein the parameter updating unit is configured to update the set default ARQ parameter using the calculated second average value.

* * * * *